United States Patent [19]

Repetti et al.

[11] Patent Number: 4,867,934
[45] Date of Patent: Sep. 19, 1989

[54] PRODUCTION OF HOLLOW NYLON FIBERS

[75] Inventors: Ronald V. Repetti, Guilford; Stephen Troy, Stamford, both of Conn.

[73] Assignee: Cuno, Inc., Meriden, Conn.

[21] Appl. No.: 137,207

[22] Filed: Dec. 23, 1987

[51] Int. Cl.$^4$ .......................... B01D 39/16; D01D 5/06
[52] U.S. Cl. .................................. 264/41; 210/500.38;
264/209.1; 264/211; 264/211.16; 264/558;
264/561; 264/562
[58] Field of Search ...................... 264/558, 561, 209.1,
264/41, 211, 211.16, 562; 210/500.38

[56] References Cited

U.S. PATENT DOCUMENTS

| | | | |
|---|---|---|---|
| 3,876,738 | 4/1975 | Marinaccio et al. | 264/41 |
| 4,127,625 | 11/1978 | Arisaka et al. | 210/500.29 |
| 4,284,594 | 8/1981 | Joh et al. | 264/41 |
| 4,322,381 | 3/1982 | Joh | 264/41 |
| 4,323,627 | 4/1982 | Joh | 210/500.23 |
| 4,340,479 | 7/1982 | Pall | 210/490 |
| 4,340,480 | 7/1982 | Pall | 210/490 |
| 4,454,085 | 6/1984 | Schindler et al. | 264/41 |
| 4,722,795 | 2/1988 | Gohl et al. | 210/500.23 |

FOREIGN PATENT DOCUMENTS 2106829  4/1983  United Kingdom ................ 264/561

Primary Examiner—Hubert C. Lorin
Attorney, Agent, or Firm—Weingram & Zall

[57] ABSTRACT

A microporous nylon hollow fiber is prepared by extruding a nylon spinning solution through an annular slit of an orifice into a quench liquid while simultaneously introducing a core liquid into the inside hollow portion of the extruded spinning solution where the weighted densities of the spinning solution, quench liquid and the core liquid are regulated such that the average of the density of the core liquid and the spinning solution is about equal to the density of the quench liquid.

10 Claims, No Drawings

PRODUCTION OF HOLLOW NYLON FIBERS

BACKGROUND OF THE INVENTION

This invention relates to hollow nylon fibers and more particularly to a method of making such fibers from microporous membranes.

Microporous membranes are well known in the art. For example, U.S. Pat. No. 3,876,738 to Marinaccio and Knight (1975) describes a process for preparing a microporous membrane, for example, by quenching a solution of a film forming polymer in a non-solvent system for the polymer U.S. Pat. Nos. 4,340,479 and 4,340,480 to Pall describe similar processes.

The microporous membranes can be formed into hollow fibers having a continuously extending hollow portion over their whole length by generally extruding a spinning solution, that is the solution of the film forming polymer, from an annular slit to form a sheath solution which is quenched and simultaneously introducing a core liquid into the inside hollow portion of the sheath solution. In a wet spinning process, the spinning solution is directly extruded into the coagulating quench bath by immersing the orifice therein. In the dry jet-wet spinning process, the spinning solution is extruded from the orifice and the resulting filament is introduced into the coagulating bath after being passed through a gaseous space between the orifice and the bath.

Joh et al., U.S. Pat. No. 4,284,594, describes a method of manufacturing a hollow fiber in which a spinning solution of a cellulose ester dissolved in an organic solvent is extruded from an annular slit and simultaneously a core liquid is introduced into the inside hollow portion of the extruded spinning solution, in which the core liquid is a hydroxycarboxylic acid, a derivative of the hydroxycarboxylic acid, monoterpene, or mixture, or a solution of such materials or mixtures. A similar procedure is described in Joh et al., U.S. Pat. Nos. 4,322,381 and 4,323,627, in which the polymer is a cellulose ester, polymethylmethacrylate, polyvinyl chloride, a polybenzyl glutamate, polyacrylonitrile or an acrylonitrile copolymer and the core of liquid is an aqueous salt solution having a salt content of 15-50% with or without sufficient alkali or acid present in the aqueous salt solution to affect controlled hydrolysis of the polymer.

Arisaka et al., U.S. Pat. No. 4,127,625, describes a method of producing asymmetric hollow fibers by spinning a solution of a fiber forming cellulose derivative through the outer tube of a double tube-type spinneret into an aqueous coagulating bath to form a hollow fiber and simultaneously injecting an aqueous salt solution through the inner tube of the spinneret to contact the interior of the hollow fiber.

In the formation of nylon hollow fibers, the solution of nylon (known as the "dope") is extruded through the annular orifice and the solids in the dope are made to congeal by contact with quench solutions both inside and outside of the dope annulus. The resulting hollow fiber generally has an outside diameter which is smaller than the diameter of the orifice plate as a result of a drawdown phenomenon which occurs just past the spinneret. At this point, the nylon dope is still in a fluid state and both the force of gravity and tensile forces act on the nascent fiber before the fiber has developed sufficient structural rigidity to resist a change in size. The combination of these forces act on the extruded dope to cause the extruded dope to collapse toward the central longitudinal axis of the extruded dope sheath. As a result of the drawdown, the final fiber diameter is often less than 50% of the diameter of the orifice through which the fiber has been extruded. Where it is desirable to make large diameter fibers, for example more than 40 mils outside diameter, it can be very difficult to make the desired fibers because even the use of large diameter orifices results in drawdown effects that ultimately yield fibers only slightly larger than those made from smaller orifices.

It is the object of this invention to provide a method of producing hollow nylon fiber products in which the drawdown phenomenon is substantially eliminated such that large diameter hollow fibers can be realized. This and other objects of the invention will become apparent to those skilled in the art from the following detailed description.

SUMMARY OF THE INVENTION

This invention relates to a method of forming a microporous nylon hollow fiber and more particularly to such a method in which a nylon dope spinning solution is extruded through an annular slit of an orifice into a quench liquid while simultaneously introducing a core liquid into the inside hollow portion of the extruded spinning solution and in which the core liquid is a quench liquid which has a density such that the average of the density of the core liquid and the spinning solution is about equal to the density of the quench liquid.

DESCRIPTION OF THE PREFERRED EMBODIMENTS

In accordance with the present invention, a microporous nylon hollow fiber, preferably skinless, is prepared by extruding a nylon dope spinning solution at the same time a core liquid is introduced into the middle hollow portion of the extruded spinning solution and the core liquid is selected such that it has a density which results in the average of the density of the ore liquid and the spinning solution being about equal to the density of the quench liquid.

The nylon hollow fibers of the present invention are microporous, that is they are substantially symmetrical and isotropic having a pore size of at least about 0.05 micron or larger and an initial bubble point in water of less than 120 psi. By symmetrical, it is meant that the pore structure is substantially the same on both sides of the membrane and by the term isotropic, it is meant that the membrane has a substantially uniform pore structure throughout the membrane. The nylon hollow fibers of the present invention are preferably skinless and are made from a nylon polymer.

While, generally, the various nylon or polyamide resins are all copolymers of a diamine and a dicarboxylic acid, or homopolymers of a lactam of an amino acid, they vary widely in crystallinity or solid structure, melting point, and other physical properties. Preferred nylons for use in this invention are copolymers of hexamethylene diamine and adipic acid (nylon 66), and homopolymers of poly-o-caprolactam (nylon 6).

Alternatively, these preferred polyamide resins have a ratio of methylene ($CH_2$) to amide (NHCO) groups within the range about 5:1 to about 8:1, most preferably about 5:1 to about 7:1. Nylon 6 and nylon 66 each have a ratio of 6:1.

The nylon polymers are available in a wide variety of grades, whic vary appreciably with respect to number average molecular weight, within the range from about 11,000 to about 40,000 and in other characteristics.

The highly preferred species of the units composing the polymer chain is polyhexamethylene adipamide, i.e. nylon 66, and number average molecular weights in the range above 30,000 are preferred. Polymers free of additives are generally preferred, but the addition of antioxidants or similar additives may have benefit under some conditions.

The basic process for forming nylon membranes by the quenching of a nylon dope is described in U.S. Pat. No. 3,876,738 to Marinaccio et al. and in U.S. Pat. No. No. 4,340,479 to Pall.

The Marinaccio et al. process for producing membrane develops a unique fine internal microstructure through the quench technique described therein, offering a superior substrate for filtration. Broadly, Marinaccio et al. produced microporous films by casting or extruding a solution of a film-forming polymer in a solvent system into a quenching bath comprised of a non-solvent system for the polymer. Although the non-solvent system may comprise only a non-solvent, the system may also be any combination of materials, including solvents, as long as the resultant non-solvent system is capable of setting a film and is not deleterious to the formed film. For example, the non-solvent system may consist of materials such as alcohol/salt or other solvent-chemical mixtures The Marinaccio et al. process employs the general steps of first forming a solution of the film-forming polymer, processing the solution to form a film and quenching the film in a bath which includes a non-solvent for the polymer For the most part, Marinaccio et al. processed the solution by casting The most important parameter responsible for development of micropores in the film, according to Marinaccio et al., is the solvent system emplbyed with the polymer and the non-solvent system used in quenching the film. The selection of the solvent for the polymer is determined by the nature of the polymer material used and can be empirically determined on the basis of solubility parameters described in detail in Marinaccio et al.

The nylon solutions which can be used in the Marinaccio et al. process include solutions of the nylons in various solvents, such as lower alkanols, e.g., methanol, ethanol and butanol, including mixtures thereof. It is known that some nylons will dissolve in solutions of acids in which they behave as polyelectrolytes and such solutions are useful. Representative acids include, for example, formic acid, citric acid, acetic acid, maleic acid and similar acids which react with nylons though protonation of nitrogen in the amide group characteristic of nylon.

The nylon solutions after formation are diluted with non-solvent for nylon and the non-solvent employed is miscible with the nylon solution Dilution with non-solvent may, according to Marinaccio et al., be effected up to the point of incipient precipitation of the nylon. The non-solvents are selected on the basis of the nylon solvent utilized For example, when water-miscible nylon solvents are employed, water can be employed. Generally, the non-solvents can be methyl formate, aqueous lower alcohols, such as methanol and ethanol, polyols such as glycerols, glycols, polyglycols, and ethers and esters thereof, water and mixtures of such compounds. Moreover, salts can also be used to control solution properties.

The quenching bath may or may not be comprised of the same non-solvent selected for preparation of the nylon solution and may also contain small amounts of the solvent employed in the nylon solution. However, the ratio of solvent to non-solvent is lower in the quenching bath than in the polymer solution in order that the desired result may be obtained. The quenching bath may also include other non-solvents, e.g., water.

After the polymer solution is quenched, it is removed from the quench bath and preferably washed free of solvent and/or non-solvent. Subsequently, the film can be at least partially dried and then treated as desired.

Pall's aforementioned U.S. Pat. No. 4,340,479 to Pall describes another similar method for the conversion of polymer to microporous membrane which may be adapted for use in this invention by extruding the dope rather than casting it. Broadly, Pall provides a process for preparing skinless hydrophilic alcohol-insoluble polyamide membranes by preparing a solution of an alcohol-insoluble polyamide resin in a polyamide solvent. Nucleation of the solution is induced by the controlled addition to the solution of a non-solvent for the polyamide resin, under controlled conditions of concentration, temperature, addition rate, and degree of agitation to obtain a visible precipitate of polyamide resin particles (which may or may not partially or completely redissolve) thereby forming a casting solution.

Pall's casting solution is then spread on a substrate to form a thin film. The film is then contacted and diluted with a mixture of solvent and nonsolvent liquids containing a substantial proportion of the solvent liquid, but less than the proportion in the casting solution, thereby precipitating polyamide resin less hydrophilic membrane The resulting membrane is then washed and dried.

In Pall's preferred embodiment of the process, the solvent for the polyamide resin solution is formic acid and the non-solvent is water. The polyamide resin solution film is contacted with the non-solvent by immersing the film, carried on the substrate, in a bath of non-solvent comprising water containing a substantial proportion of formic acid.

These preferred nylon membranes, i.e. described in Marinaccio et al. and Pall, are characterized by an isotropic structure, having a high effective surface area and a fine internal microstructure of controlled pore dimensions with narrow pore size distribution and adequate pore volume. For example, a representative 0.22 micrometer rated nylon 66 membrane (polyhexamethylene adipamide) exhibits an initial bubble point (IBP) of about 45 to 50 psid, a foam all over point (FAOP) of about 50 to 55 psid, provides a flow of from 70 to 80 ml/min of water at 5 psid (47 mm. diameter discs), has a surface area (BET, nitrogen absorption) of about 13 m2/g and a thickness of about 4.5 to 4.75 mils.

In accordance with the present invention, the polymer dope is extruded in a spinneret wile simultaneously introducing a core liquid into the inside hollow portion of the extruded dope. The extrusion can be carried out by the wet spinning process in which the dope is directly extruded into the coagulating bath through the orifice immersed therein or can be effected truded from the orifice and through a gaseous space before being introduced into the coagulating bath. When the gas is air, there is a tendency for skin formation. The wet spinning procedure is preferred.

The purpose of the core liquid heretofore has been twofold. By using a quench liquid as the core liquid, the hollow fiber can be caused to congeal simultaneously at the inside and outside surfaces. Also, the core liquid prevents the extruded hollow fiber dope from completely collapsing on itself. In practice, however, while the core liquid prevents complete collapse, a substantial necking-in, i.e. reduction in circumference, is observed.

It has been found, however, that by controlling the density of the core liquid solution and of the outer quench solution, most of the gravitational effects on the nascent fiber can be eliminated and the necking-in or drawdown effect can be largely, if not completely, eliminated. To accomplish this result, the density of the quench liquid and the core liquid are regulated such that the average of the density of the core liquid and the dope is about equal to the density of the quench liquid. By about equal is meant that the two densities do not vary by more than about 0.5% and preferably by not more than about 0.2%.

The densities referred to herein are weighted densities unless otherwise stated since the amount of core liquid and dope at any given slice perpendicular to flow are not the same. The ratio of the two fluids' volumetric flows is therefore used to adjust (i.e., weight) the density values used for regulation.

Based on the usual density of the nylon dope, it has been found that the main quench and core liquids should preferably have a specific gravity (absolute units) in the range of about 1.0-1.2. The main quench and core liquids can be formed by dissolving an appropriate amount of an additive to give the desired density in one or a combination of the solvents and nonsolvents. The additive can be any one or more hydroxyacids such as citric, maleic, lactic, glycolic, tartartic, malonic, glutaric, glycerol or inorganic salts such as calcium chloride, magnesium chloride or zinc bromide. These materials may be dissolved, for example, in water and/or methanol However, additives which act on the polymer dope to form a skin, such as sodium chloride or sodium citrate, should be avoided The preferred additive is presently citric acid which is readily soluble in water and can be used to make solutions of the appropriate density, is relatively non-hazardous, is abundantly available in high purity, and whose use results in membrane morphology similar to that of water-methanol quenched membranes.

In most instances, the center core liquid density is regulated based on the density of the nylon dope and the main quench liquid. For example, if the dope density is 1.182 g/ml and the main quench density is about 1.164 g/ml, the density of the core liquid will fall within the range of 1.135 to 1.157, and preferably 1.142 to 1.150 g/ml. When the density of the dope is the highest of the three densities, which is usually the case, the density of the core liquid will always be less than that of the main quench liquid Typically when the center or core quench density is equal to or greater than that of the main quench solution, in these instances, aneurism-like fiber defects appear. On the other hand, if the center quench density is too low, it is difficult to maintain a smooth fiber spinning operation because the extruded fiber tends to rise in the main quench bath and form kinks in or otherwise distort the fiber.

In order to further illustrate the invention, various examples are given below. In these examples, all parts and percentages are by weight and all temperatures are in degrees Centigrade, unless otherwise indicated. Examples 5 and 6 are comparative examples.

EAMPLES 1

A nylon dope composition was prepared by combining 21% of nylon 66, 2.9% methanol and 76.1% formic acid. The polymer dope had a density of 1.182 g/ml. The main quench bath was a mixture of citric acid and water having a density of 1.155.

The nylon dope was extruded through a spinneret having a 90 mil orifice directly into a bath containing the main quench liquid at the rate of 3.7 feet per minute. At the same time, a liquid having the same composition as the main quench liquid was introduced into the inside hollow portion of the extruded nylon dope at the same rate.

The resulting hollow fiber had an outside diameter of 35 mils and an inside diameter of 19 mils. Initial bubble point of membrane made from the dope was 40 psi and its foam all over point was 53 psi.

EXAMPLE 2

A nylon dope composition was prepared by combining 24% of nylon 66, 2.4% methanol and 73.6% formic acid. Quench fluid consisting of 34% citric acid in water was used for the main and center quench fluids.

The nylon dope was extruded through a spinneret with a 90 mil orifice. Quench fluid was injected into the center of the nylon dope via a number 21 hypodermic needle positioned within the spinneret body. Fiber extrusion rate was 2.2 ft/min. The wet, freshly extruded fiber had dimensions of 75 mils outside diameter and 50 mils inside diameter, which after washing and drying resulted in a fiber with 63 mils outside diameter. Initial bubble point of the fiber was 63 psi and its foam all over point was 75 psi.

EXAMPLES 3

A 24% nylon dope with 0.7% methanol and 75.3% formic acid was prepared and extruded through the annulus between a 90 mil orifice spinneret and a number 19 hypodermic needle. The citric acid and water main quench bath specific gravity was 1.139 and the aqueous citric acid and methanol bore fluid specific gravity was 1.081. Fiber extrusion rate was 3.3 ft/min. The resulting hollow fibers were estimated to have outside diameters of 50 to 60 mils. Flat membrane cast from this dope had an initial bubble point of 17 psi and a foam all over point of 21 psi.

EXAMPLE 4

A 21% solids nylon dope was made containing 2.6% methanol and 76.4% formic acid. The dope was extruded through the annular space in a spinneret having a 90 mil orifice and a number 21 hypodermic needle. Citric acid and water was used for main and center quench fluids, which had specific gravities of 1.164 and 1.143 respectively. Fiber extrusion rate was 2.9 ft/min. Freshly extruded wet fiber had 88 mils outside diameter and 53 mils inside diameter. After washing and drying, this fiber had 81 mils outside diameter and 51 mils inside diameter. Initial bubble point of the fiber was 34 psi and its foam all over point was 38 psi.

EXAMPLE 5

A 21% solids nylon dope was made with 3.5% methanol and 75.5% formic acid. The dope was extruded through a spinneret annulus having a 90 mil orifice and a centrally positioned number 20 hypodermic needle. Quench fluid in the main bath and in the needle bore were identical solutions of methanol and water, having a specific gravity of 0.973. Fiber extrusion rate was 3.6 to 6.4 ft/min. The hollow fiber produced had outside diameters in the range of 41 to 55 mils and inside diameters in the range of 20 to 31 mils. Fiber extrusion was erratic and resulted in fibers with surface defects including kinks and aneurism-like bulges. Membrane cast from the dope used for this fiber run had an initial bubble point of 48 psi and a foam all over point of 54 psi.

EXAMPLE 6

A 21% solids nylon dope was made with 2.9% methanol and 76.1% formic acid. The dope was extruded through a spinneret annulus having a 120 mil orifice and a centrally positioned number 19 hypodermic needle. Quench fluid in the main bath and in the needle bore were identical solutions of methanol and water having a specific gravity of 0.962. It was not possible to produce hollow fibers continuously under these conditions despite numerous and various attempts to do so. A principal problem was the severe necking down of the nascent fiber immediately after its emergence from the spinneret, so that fibers of 40 mils inside diameter or more, could not be produced. Flat membrane cast from this dope had an initial bubble point of 33 psi and a foam all over point of 37 psi.

Various changes and modifications can be made in the process of the present invention without departing from the spirit and scope thereof. The various embodiments which have been disclosed herein were for the purpose of further illustrating the invention but were not intended to limit it.

What is claimed is:

1. A method of decreasing necking-in of an extruded nylon dope solution having a tendency to neck-in due to gravitational effects during formation of a skinless, microporous nylon fiber therefrom, said method comprising:

extruding said nylon dope solution directly into a bath quench liquid through an annular slit of an orifice immersed in the bath quench liquid to thereby form an extruded nylon dope solution;

simultaneously introducing a core quench liquid into the inside hollow portion of the extruded nylon dope solution;

admixing an amount of an hydroxyacid or an organic salt with the core or quench liquid to adjust the average density of the core quench liquid and the dope solution to substantially equal the density of the bath quench liquid to thereby decrease the tendency of the extruded nylon solution to nick-in.

2. The method of claim 1, comprising admixing hydroxyacid with the core and quench liquid.

3. The method of claim 1, wherein the fiber outer diameter is at least 40 mils.

4. The method of claim 1, wherein the average of the density of the core quench liquid and the dope solution and the density of the bath quench liquid do not differ by more than 0.2%.

5. The method of claim 1, wherein the density of the core quench liquid is less than the density of the bath quench liquid.

6. The method of claim 1, wherein the specific gravity of the core quench liquid is from about 1–1.2.

7. The method of claim 6, wherein the density of the core quench liquid is less than the density of the bath quench liquid.

8. The method of claim 6, wherein the average of the density of the core quench liquid and dope solution and the density of the bath quench liquid do not differ by more than 0.2%.

9. The method of claim 2 wherein the nylon is nylon 66.

10. The method of claim 9, wherein the hydroxyacid is citric acid.

* * * * *